(12) United States Patent
Logan et al.

(10) Patent No.: US 9,945,227 B2
(45) Date of Patent: Apr. 17, 2018

(54) MIXED-MODE TELEMETRY SYSTEMS AND METHODS

(71) Applicant: EVOLUTION ENGINEERING INC., Calgary (CA)

(72) Inventors: Justin C. Logan, Calgary (CA); Mojtaba Kazemi Miraki, Calgary (CA); Aaron W. Logan, Calgary (CA); Daniel W. Ahmoye, Calgary (CA); Patrick R. Derkacz, Calgary (CA); Barry Daniel Buternowsky, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 15/321,666

(22) PCT Filed: May 8, 2015

(86) PCT No.: PCT/CA2015/050416
§ 371 (c)(1),
(2) Date: Dec. 22, 2016

(87) PCT Pub. No.: WO2015/196277
PCT Pub. Date: Dec. 30, 2015

(65) Prior Publication Data
US 2017/0211377 A1 Jul. 27, 2017

Related U.S. Application Data

(60) Provisional application No. 62/015,893, filed on Jun. 23, 2014.

(51) Int. Cl.
*E21B 47/12* (2012.01)
*E21B 47/18* (2012.01)
*E21B 47/02* (2006.01)
*E21B 4/02* (2006.01)

(52) U.S. Cl.
CPC ............ *E21B 47/122* (2013.01); *E21B 47/02* (2013.01); *E21B 47/18* (2013.01); *E21B 4/02* (2013.01)

(58) Field of Classification Search
CPC ......... E21B 47/122; E21B 47/02; E21B 47/18
USPC ....................................... 340/854.6
See application file for complete search history.

(56) References Cited

U.S. PATENT DOCUMENTS 5,160,925 A * 11/1992 Dailey ................. E21B 47/011
175/40
2007/0247328 A1* 10/2007 Petrovic ............... G01V 11/002
340/853.7
2010/0194586 A1 8/2010 Tjhang et al.

FOREIGN PATENT DOCUMENTS

| CA | 2617328 A1 | 8/2003 |
| GB | 0611833 | 7/2006 |
| GB | 2428054 A | 1/2007 |
| GB | 0804965 | 4/2008 |
| WO | 2014127489 A1 | 8/2014 |

* cited by examiner

*Primary Examiner* — Albert K Wong
(74) *Attorney, Agent, or Firm* — Oyen Wiggs Green & Mutala LLP (57) ABSTRACT

A telemetry method transmits data by MP telemetry to a telemetry relay system which retransmits the data by EM telemetry. The method avoids the need to incorporate MP telemetry pressure transducers into rig equipment and permits telemetry from regions unfavorable for EM telemetry because of depth and/or characteristics surrounding formations.

36 Claims, 5 Drawing Sheets

MIXED-MODE TELEMETRY SYSTEMS AND METHODS

TECHNICAL FIELD

This application relates to subsurface drilling, specifically, to telemetry of data from downhole systems. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. A downhole system may comprise any active mechanical, electronic, and/or electromechanical system that operates downhole and may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc.

Downhole conditions can be harsh. A downhole system may experience high temperatures; vibrations (including axial, lateral, and torsional vibrations); shocks; immersion in drilling fluids; high pressures (20,000 p.s.i. or more in some cases); turbulence and pulsations in the flow of drilling fluid past the probe; fluid initiated harmonics; and torsional acceleration events from slip which can lead to side-to-side and/or torsional movement of the system. These conditions can shorten the lifespan of downhole systems and can increase the probability that a downhole system will fail in use. Replacing a downhole system that fails while drilling can involve very great expense.

A downhole system may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

There remains a need for telemetry systems that are effective for communicating data to surface equipment, particularly, from deeper boreholes or boreholes which pass through formations that highly attenuate EM telemetry signals.

SUMMARY

This invention has a number of aspects. Some aspects provide downhole systems and apparatus. Other aspects provide methods for downhole data communication.

An example aspect provides a telemetry relay system useful in downhole applications. The telemetry relay system comprises: a pressure sensor arranged to detect pressure fluctuations corresponding to mud pulse telemetry signals; an electromagnetic telemetry transmitter; and a controller connected to the pressure sensor and the electromagnetic telemetry transmitter. The controller is configured to: process an output of the pressure sensor to yield a decoded signal; re-encode the decoded signal in an EM telemetry data format; and transmit the re-encoded signal by the electromagnetic telemetry transmitter. The controller has a first mode in which data bits decoded from the mud pulse telemetry signal are transmitted as soon as they have been decoded and a second mode in which the data bits decoded from the mud pulse telemetry signal are buffered until a certain quantity of data is available for transmission by EM telemetry. The first mode may, for example, be used when survey data is being transmitted. The second mode may, for example be used when frames transmitting directional drilling information are being transmitted. The frames may include direction and inclination.

The controller may be configured to switch to the first or second mode automatically, for example in response to the nature of the data it is receiving. In some embodiments the controller is configured to switch modes in response to detecting a header or other encoding in a frame of data received at the telemetry relay system.

The electromagnetic telemetry transmitter may communicates data directly or indirectly to surface equipment. In some embodiments data is transmitted by way of a plurality of EM telemetry relay systems uphole from the telemetry relay system. Each EM telemetry relay system may pass data up the drill string toward surface equipment. In some embodiments at least one of the EM telemetry relay systems has a standby mode. The at least one EM telemetry relay system may be placed in standby mode when it is in a region of the wellbore in which EM telemetry signals are not too strongly attenuated.

It can be advantageous to locate the telemetry relay system in a drill string near the surface but below the rotary table of a drill rig.

Data may originate at a downhole system. Some embodiments provide a system including the combination of a telemetry relay system and a downhole system comprising: one or more sensors arranged to collect data regarding conditions downhole; a mud pulse telemetry system comprising a valve located to modulate a flow of drilling fluid through a bore of the drill string; and a downhole system controller connected to receive from the sensors data to be transmitted and to operate the valve to modulate the flow of drilling fluid in the bore of the drill string. The sensors may comprise one or more sensors selected from the group consisting of: inclination sensors, direction sensors, tool face sensors, radiation sensors, resistivity sensors, temperature sensors, water/oil cut sensors, and pressure sensors.

In some embodiments the valve is uphole from a mud motor and the sensors are downhole from the mud motor.

Another example aspect provides a method for transmitting data from a location in a well bore to or toward the surface. The method comprises acquiring data to transmit at a point or location in the well bore; transmitting the data by way of mud pulse telemetry; and receiving the data at a telemetry relay device located within the well bore below the surface; and retransmitting the data to surface equipment by EM telemetry. The method comprises, at different times, operating the telemetry relay device in a first mode in which the telemetry relay device transmits data bits decoded from the mud pulse telemetry as soon as they have been decoded and a second mode in which the telemetry relay device buffers the data bits decoded from the mud pulse telemetry signal until a certain quantity of data is available for transmission by EM telemetry.

In some embodiments the point at which the data is acquired is in a bottom hole assembly of the drill string. The point may be near or at a drill bit. In some embodiments acquiring the data is performed below a mud motor and transmitting the data by way of mud pulse telemetry is performed using a valve located above the mud motor. In some embodiments the telemetry relay system is located just below a rotary table of a drill rig.

In some embodiments transmitting the data by way of mud pulse telemetry comprises: generating variable-frequency siren mud pulses; and/or generating mud pulses having frequencies higher than the noise associated with drilling. For example, the mud pulses may have frequencies in excess of 6 Hz.

Receiving the data at a telemetry relay device may comprise performing spectral analysis (e.g. using a fast Fourier transform algorithm) of detected pressure variations.

Some embodiments comprise extending the well bore to a depth below a formation that is not good for EM telemetry and performing the method when the sensors are downhole from the formation and the telemetry relay system is uphole from the formation. In some embodiments retransmitting the data to surface equipment comprises transmitting the data by multiple hops, each hop involving transmission by an EM telemetry transmitter to a receiver further uphole. An uppermost one of the EM telemetry relay systems may be very near to the surface.

Some embodiments involve sequentially sending the data from the telemetry relay device through a plurality of EM telemetry relay systems. Optionally one or more of the EM telemetry relay systems may be placed in a standby mode such that EM telemetry signals bypass the one or more of the EM telemetry relay systems. An EM telemetry relay system may be placed in the standby mode in response to the EM telemetry relay system being at a location where EM telemetry signals are not as strongly attenuated as in other portions of the well bore.

Some embodiments use the first mode when survey data is being transmitted. Some embodiments use the second mode when frames transmitting directional drilling information are being transmitted. The method optionally comprises switching automatically to the first or second mode. The switching may be performed in response to the nature of the data. For example, switching modes may be triggered in response to detecting a header or other encoding in a frame of data.

Other aspects of the invention and features of example embodiments are described herein and/or illustrated in the accompanying drawings.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
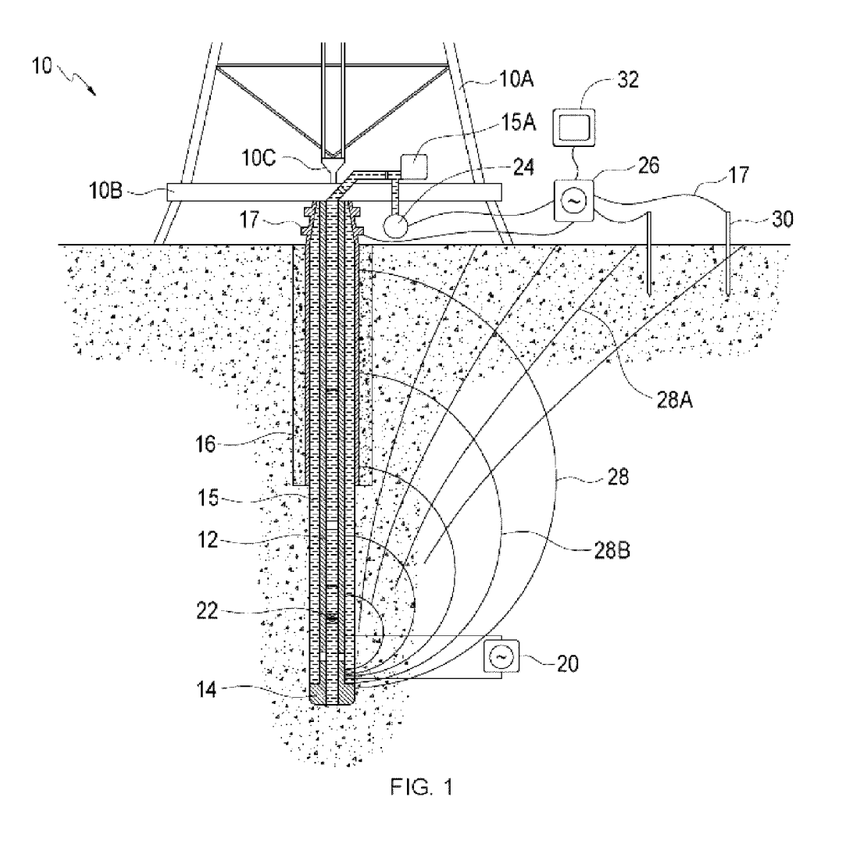
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

One aspect of this invention provides methods for transmitting data from a location in the well bore to or toward the surface. The methods involve acquiring data to transmit at a point in the well bore. This point may, for example, be in the BHA, and may be near or at the drill bit in some embodiments. This information is transmitted by way of mud pulse telemetry to a receiving device located within the well bore below the surface. The receiving device receives the MP telemetry data, for example by detecting pressure pulses with a pressure transducer and then retransmits the data to surface equipment by EM telemetry. The EM telemetry may comprise transmitting the data by multiple hops, each hop involving transmission by an EM telemetry transmitter to a receiver further up the well bore which receives and then retransmits the signal as a further EM telemetry signal until the signal is received at surface equipment. In other embodiments the EM telemetry signal is transmitted directly to surface equipment.

One advantage of this method is that it avoids the need to provide an MP telemetry pressure transducer at surface equipment, for example, on a stand pipe, swivel, or goose neck. In addition, received MP telemetry pulses are higher in fidelity since these pulses are received at a location downhole where they are not obscured by noise created by pumps, and other noise sources at the rig, and are not distorted by reflections caused by pipe diameter-changes or by changes in direction in piping at the rig. In addition, locating a MP transducer (e.g. a pressure sensor) at a position below the rig and away from rig pump noise allows reliable detection of pressure pulses smaller in amplitude and/or duration than could be detected with the same transducer in a conventional location in the rig. This capability may be used to transmit information by MP telemetry at higher data rates than would otherwise be possible. For example, data transmission using variable-frequency siren mud pulses may be used to achieve increased data rates.

An advantage of generating mud pulses having frequencies higher than the noise associated with drilling (which typically has highest energies in the frequency range of 0 to 6 Hz) is that at such frequencies mud pulses of relatively low amplitude can be reliably detected by spectral analysis of detected pressure variations (for example applying a fast Fourier transform (FFT) algorithm).

Another advantage of the method is that it extends the reach of EM telemetry which is sometimes not usable from locations deep in the well bore because the EM telemetry signals may be attenuated too strongly to be received at the surface.

Another aspect of the invention provides downhole telemetry systems that include a telemetry relay system comprising an EM telemetry transmitter and an MP telemetry receiver. Such a telemetry relay system may be configured to receive data by MP telemetry and to then retransmit the data by EM telemetry.

Another aspect of the invention comprises a drill string comprising a data source and an MP telemetry transmitter at a first location in the drill string. In some embodiments, the first location is in a BHA. A telemetry relay system is located in the drill string between the first location and the surface. The telemetry relay system has an MP telemetry receiver, an EM telemetry transmitter, and a controller configured to retransmit on the EM telemetry transmitter data received on the MP telemetry receiver. In some embodiments, the controller is configured to decode and reformat the data before retransmitting the data. The relay system may optionally modify the data before retransmitting the data. For example, the relay system may select from the data and/or add to the data, For example, the relay system may incorporate one or more sensors and may include data based on readings of the one or more sensors in the retransmitted data. As another example, the relay system may calculate values based on data received and may include those calculated values in the retransmitted data.

Figure 2:
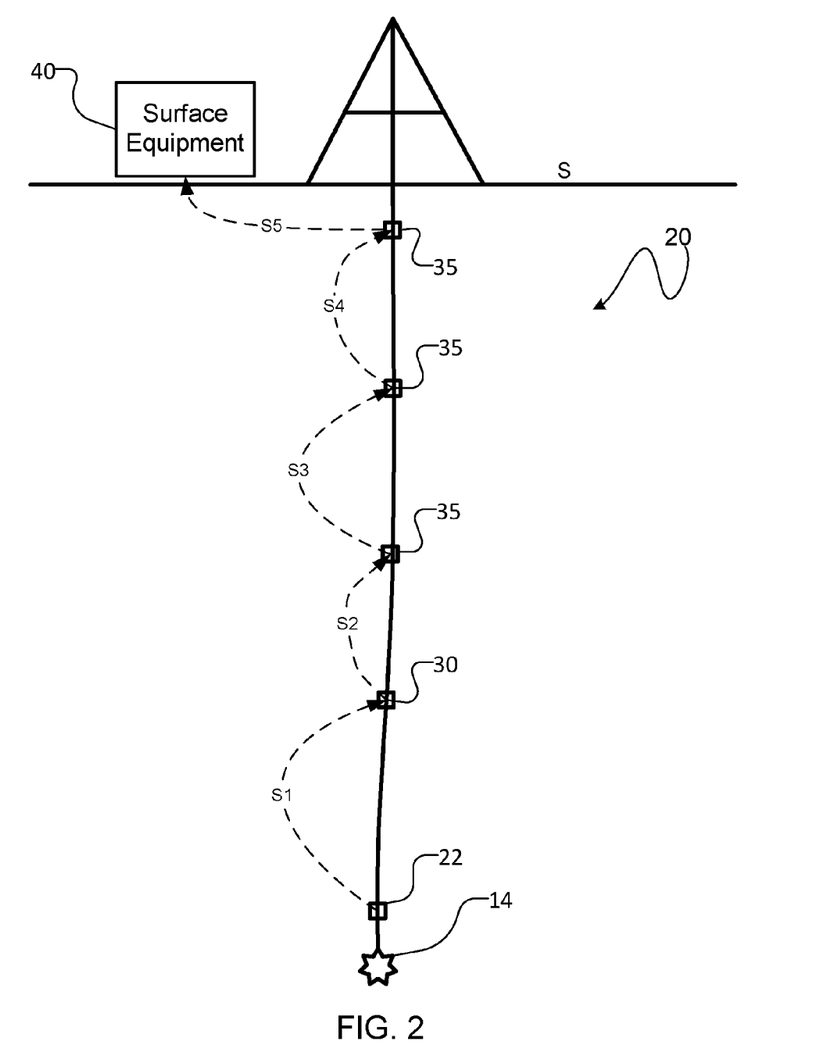
FIG. 2 is a schematic view of a drill string incorporating a telemetry system according to an example embodiment.
Figure 2A:
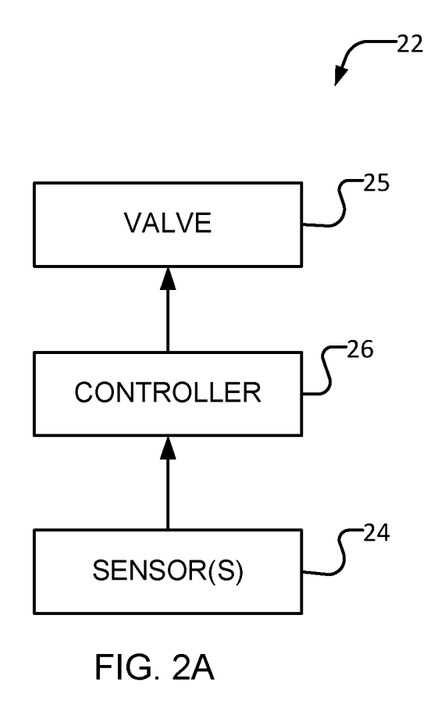
FIG. 2A is a block diagram of an example downhole system.

FIG. 2 shows schematically a drill string 20 according to an example embodiment. Drill string 12 extends from the surface S down to a drill bit 14. Near drill bit 14 is a downhole system 22 which includes one or more sensors 24 (see FIG. 2A) which collect data regarding conditions downhole. Sensors 24 may include any of a wide range of sensors. For example, the sensors may comprise MWD sensors (e.g. inclination, direction, tool face sensors) or LWD sensors (e.g. radiation sensors, resistivity sensors, or the like) or sensors of other parameters (e.g. temperature sensors or water/oil cut sensors and/or pressure sensors). Downhole system 22 also includes an MP telemetry system which includes a valve 25 located to modulate a flow of drilling fluid through a bore of the drill string. Valve 25 is controlled by a controller 26. Controller 26 receives data to be transmitted and is configured to operate valve 25 to modulate the flow of drilling fluid in the bore of the drill string to yield pressure pulses which propagate upward through the drill string. The pattern of pressure pulses, when detected at a location closer to the surface, may be received and decoded to yield the data being transmitted. Downhole system 22 optionally also includes an EM telemetry system. Controller 26 may operate the EM telemetry system to transmit data using the MP telemetry system, the EM telemetry system or both of the MP telemetry system and the EM telemetry system.

In some embodiments, some or all of sensors 24 are located below a mud motor and a valve 25 used for MP telemetry of data from the sensors 24 is located above the mud motor in the drill string.

At least one telemetry relay system 30 which includes signal conversion apparatus is provided uphole from downhole system 22. Optionally, above the telemetry relay system 30 are one or more EM telemetry relay systems 35.

The illustrated system operates at downhole system 22 by transmitting by MP telemetry data received from sensors 24. This transmission, which is received at telemetry relay system 30 is indicated as S1.

Figure 2B:
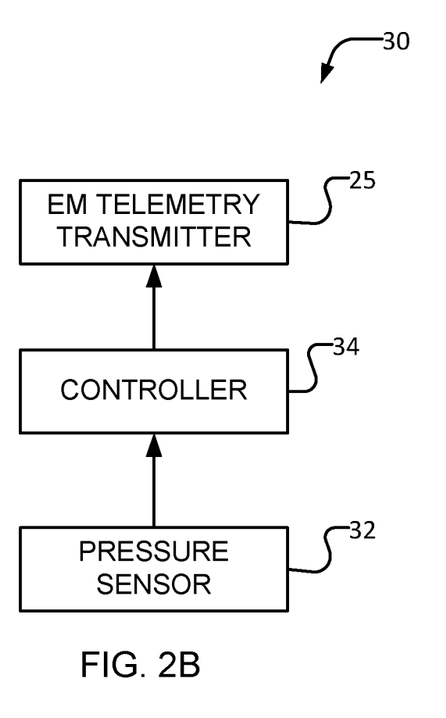
FIG. 2B is a block diagram of an example telemetry relay system.

FIG. 2B is a block diagram of an example telemetry relay system 30. Telemetry relay system 30 receives the MP telemetry data by monitoring pressure fluctuations at a pressure sensor 32. The pressure pulses are decoded by a controller 34 to yield a decoded signal. The decoded signal is then re-encoded in an EM telemetry data format and transmitted by way of an EM telemetry transmitter 36.

In general the EM telemetry data format will be different from the data format used to transmit the MP telemetry signal. In some embodiments, the EM telemetry transmitter at telemetry relay system 30 is configured to transmit data bits toward the surface equipment as soon as those data bits have been decoded from the MP telemetry signal. In other embodiments telemetry relay system 30 is configured to buffer incoming data until a certain quantity of data is available for transmission by EM telemetry. In some embodiments telemetry relay system 30 is configured with a first mode in which available data is retransmitted without waiting for more data to be available and a second mode in which data is buffered until a desired quantity of data is available for transmission by EM telemetry. The first mode, for example, may be used when survey data is being transmitted. The second mode, for example, may be used when sliding frames (frames transmitting directional drilling information such as direction and inclination) are being transmitted. In some embodiments telemetry relay system 30 switches automatically between these modes. For example, telemetry relay system 30 may automatically switch modes in response to the nature of the data it is receiving. The nature of the data may, for example, be specified by a header or other encoding in a frame of data received at telemetry relay system 30.

Above data conversion system 30, in the illustrated embodiment, are a plurality of EM telemetry relay systems 35 which pass data up the drill string to surface equipment 40. In some embodiments, EM telemetry relay systems 35 are not required and telemetry relay system 30 communicates data directly with surface equipment 40 by EM telemetry.

This portion of the system between telemetry relay system 30 and the surface may work in a number of different modes. In some embodiments and in some modes the EM telemetry signal is sequentially sent from one EM telemetry relay system 35 to the next up the drill string. In some embodiments and some modes, some of EM telemetry relay systems 35 may be placed in a standby mode such that EM telemetry signals bypass those EM telemetry relay systems 35. An EM telemetry relay system 35 may, for example, be placed in standby mode if it is located in a portion of the drill string in which EM telemetry is not as strongly attenuated as in other portions of the drill string such that signals from one of the EM telemetry relay systems 35 downhole can be successfully received at another one of the EM telemetry relay systems 35 uphole from the EM telemetry relay system 35 that is placed on standby.

In some embodiments, an EM telemetry relay system 35 is placed very near to the surface. For example, one EM telemetry relay system 35 may be placed just below the rotary table of a drill rig. From this position, the highest one of the EM telemetry relay systems 35 can readily transmit a signal that will be clearly received at surface equipment even in the presence of some electrical noise as is usually present in the vicinity of drill rigs.

In some drilling situations drilling proceeds through one or more "poor" formations that are not very suitable for EM telemetry, for example, because of relatively high electrical conductivity. In some such cases, formations below the poor formations are once again suitable for EM telemetry. In some embodiments, downhole system 22 comprises both MP and EM telemetry transmitters. In such embodiments, the downhole system 22 may transmit by way of EM telemetry until it hits the poor formation at which point it may switch or be switched to using MP telemetry. After drilling progresses to the point that downhole system 22 is below the poor formation, downhole system 22 may switch or be switched back to transmit data by EM telemetry. If downhole system 22 becomes too deep to reliably communicate data by EM telemetry it may switch or be switched to communicate the data by MP telemetry.

Figure 3:
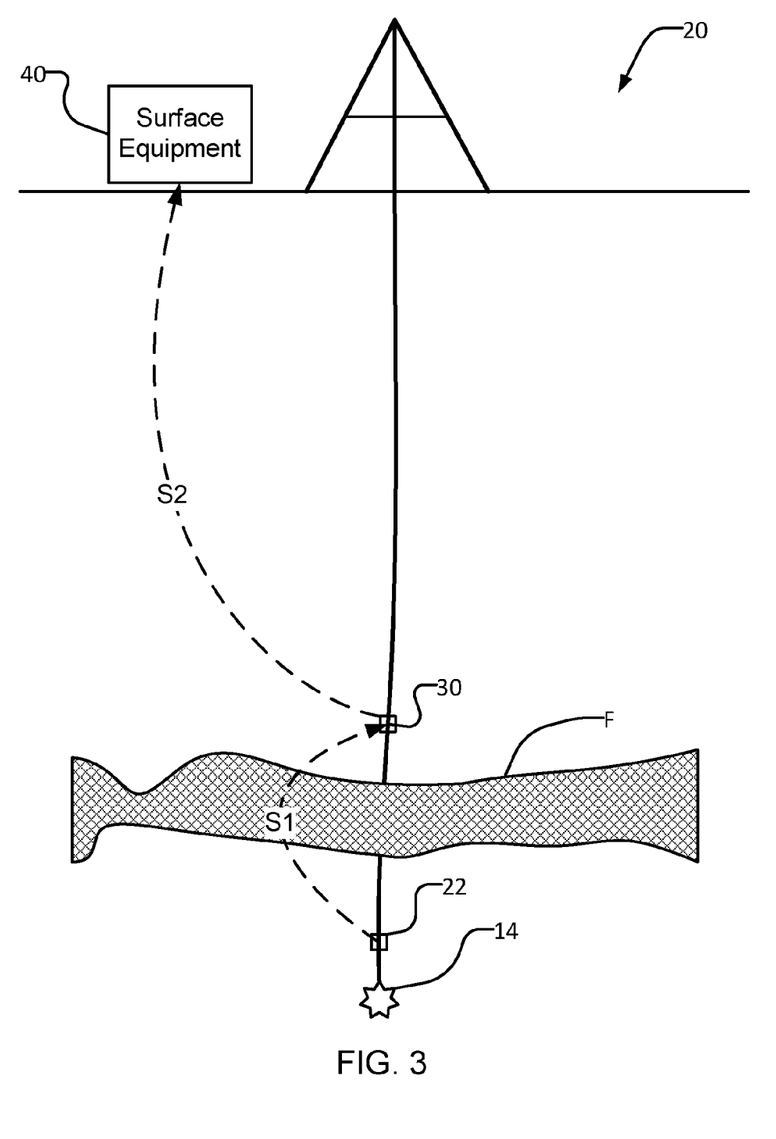
FIG. 3 is a schematic diagram illustrating an example application.

An example application is illustrated in FIG. 3 in which drilling has proceeded though a formation F that is not good for EM telemetry. The distance from the surface to formation F is known. EM telemetry relay system is kept in a portion of the drill string that is above formation F. This ensures reliable EM telemetry communication between telemetry relay system 30 and surface equipment 40. Data from downhole system 22 is transmitted to telemetry relay system by MP telemetry signals S1. Telemetry relay system 30 retransmits the data to surface by way of EM telemetry signals S2.

In some embodiments a tool 33 or 20 includes one or more ports for wired connection to a tool 30. Where a tool 30 supports a wired connection ('wired' includes connections made using optical fibers as well as electrically-conductive wires) then a direct wired connection may be made between tool 30 and tool 33 or 20. In such cases inductive loops are not required. Tool 33 may comprise a variety of ports configured for connection to different wired connections used by different tools 30.

An advantage of some embodiments is reduced power consumption by a tool 30 since better coupling of tool 30 to a tool 33 ore 20 may facilitate reducing the power of a data transmitter. Additionally, better coupling may result in fewer damaged data frames and less retransmission of data.

Embodiments of the invention may include controllers implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, single-chip computers, and the like. For example, one or more data processors in a control circuit for a device may implement methods as described herein by executing software instructions in a program memory accessible to the processors.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

INTERPRETATION OF TERMS

Unless the context clearly requires otherwise, throughout the description and the claims:
"comprise," "comprising," and the like are to be construed in an inclusive sense, as opposed to an exclusive or exhaustive sense; that is to say, in the sense of "including, but not limited to".
"connected," "coupled," or any variant thereof, means any connection or coupling, either direct or indirect, between two or more elements; the coupling or connection between the elements can be physical, logical, or a combination thereof.
"herein," "above," "below," and words of similar import, when used to describe this specification shall refer to this specification as a whole and not to any particular portions of this specification.
"or," in reference to a list of two or more items, covers all of the following interpretations of the word: any of the items in the list, all of the items in the list, and any combination of the items in the list.
the singular forms "a," "an," and "the" also include the meaning of any appropriate plural forms.
Words that indicate directions such as "vertical," "transverse," "horizontal," "upward," "downward," "forward," "backward," "inward," "outward," "vertical," "transverse," "left," "right," "front," "back", "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:
1. A telemetry relay system useful in downhole applications, the telemetry relay system comprising:
a pressure sensor arranged to detect pressure fluctuations corresponding to mud pulse telemetry signals;
an electromagnetic telemetry transmitter;
a controller connected to the pressure sensor and the electromagnetic telemetry transmitter and configured to:
process an output of the pressure sensor to yield a decoded signal;
re-encode the decoded signal in an EM telemetry data format; and
transmit the re-encoded signal by the electromagnetic telemetry transmitter;
wherein the controller has a first mode in which data bits decoded from the mud pulse telemetry signal are transmitted as soon as they have been decoded and a second mode in which the data bits decoded from the mud pulse telemetry signal are buffered until a certain quantity of data is available for transmission by EM telemetry.

2. A telemetry relay system according to claim 1 wherein the first mode is used when survey data is being transmitted.

3. A telemetry relay system according to claim 1 wherein the second mode is used when frames transmitting directional drilling information are being transmitted.

4. A telemetry system according to claim 3 wherein the frames transmitting directional drilling information include direction and inclination.

5. A telemetry relay system according to claim 1 wherein the controller is configured to switch to the first or second mode automatically.

6. A telemetry relay system according to claim 5 wherein the controller is configured to switch modes in response to the nature of the data it is receiving.

7. A telemetry relay system according to claim 6 wherein the controller is configured to switch modes in response to detecting a header or other encoding in a frame of data received at the telemetry relay system.

8. A telemetry relay system according to claim 1 wherein the electromagnetic telemetry transmitter communicates data directly with surface equipment.

9. A telemetry relay system according to claim 1 in a drill string in combination with a plurality of EM telemetry relay systems uphole from the telemetry relay system, the plurality of EM telemetry relay systems configured to pass data up the drill string to surface equipment.

10. A telemetry relay system according to claim 9 wherein at least one of the EM telemetry relay systems has a standby mode.

11. A telemetry relay system according to claim 1 wherein the telemetry relay system is in a drill string near the surface but below the rotary table of a drill rig.

12. A telemetry relay system according to claim 1 in combination with a downhole system comprising:
one or more sensors arranged to collect data regarding conditions downhole;
a mud pulse telemetry system comprising a valve located to modulate a flow of drilling fluid through a bore of the drill string; and
a downhole system controller connected to receive from the sensors data to be transmitted and to operate the valve to modulate the flow of drilling fluid in the bore of the drill string.

13. A telemetry relay system according to claim 12 wherein the sensors comprise one or more sensors selected from the group consisting of: inclination sensors, direction sensors, tool face sensors, radiation sensors, resistivity sensors, temperature sensors, water/oil cut sensors, and pressure sensors.

14. A telemetry relay system according to claim 13 wherein the valve is uphole from a mud motor and the sensors are downhole from the mud motor.

15. A method for transmitting data from a location in a well bore to or toward the surface, the method comprising:
acquiring data to transmit at a point in the well bore;
transmitting the data by way of mud pulse telemetry;
receiving the data at a telemetry relay device located within the well bore below the surface; and
retransmitting the data to surface equipment by EM telemetry;
wherein the method comprises, at different times, operating the telemetry relay device in a first mode in which the telemetry relay device transmits data bits decoded from the mud pulse telemetry as soon as they have been decoded and a second mode in which the telemetry relay device buffers the data bits decoded from the mud pulse telemetry signal until a certain quantity of data is available for transmission by EM telemetry.

16. A method according to claim 15 wherein the point is in a bottom hole assembly of the drill string.

17. A method according to claim 16 wherein the point is near or at a drill bit.

18. A method according to claim 15 wherein acquiring the data is performed below a mud motor and transmitting the data by way of mud pulse telemetry is performed using a valve located above the mud motor.

19. A method according to claim 15 wherein transmitting the data by way of mud pulse telemetry comprises generating variable-frequency siren mud pulses.

20. A method according to claim 15 wherein transmitting the data by way of mud pulse telemetry comprises generating mud pulses having frequencies higher than the noise associated with drilling.

21. A method according to claim 20 wherein the mud pulses have frequencies in excess of 6 Hz.

22. A method according to claim 15 wherein receiving the data at a telemetry relay device comprises performing spectral analysis of detected pressure variations.

23. A method according to claim 22 wherein the spectral analysis comprises applying a fast Fourier transform (FFT) algorithm.

24. A method according to claim 15 comprising extending the well bore to a depth below a formation that is not good for EM telemetry and performing the method when the sensors are downhole from the formation and the telemetry relay system is uphole from the formation.

25. A method according to claim 15 wherein retransmitting the data to surface equipment comprises transmitting the data by multiple hops, each hop involving transmission by an EM telemetry transmitter to a receiver further uphole.

26. A method according to claim 15 comprising sequentially sending the data from the telemetry relay device through a plurality of EM telemetry relay systems.

27. A method according to claim 26 comprising placing one or more of the EM telemetry relay systems in a standby mode such that EM telemetry signals bypass the one or more of the EM telemetry relay systems.

28. A method according to claim 27 comprising placing the one or more of the EM telemetry relay systems in the standby mode when the one or more of the EM telemetry relay systems are at locations where EM telemetry is not as strongly attenuated as in other portions of the well bore.

29. A method according to claim 27 wherein an uppermost one of the EM telemetry relay systems is very near to the surface.

30. A method according to claim 15 wherein the telemetry relay system is located just below a rotary table of a drill rig.

31. A method according to claim 15 comprising using the first mode when survey data is being transmitted.

32. A method according to claim 15 comprising using the second mode when frames transmitting directional drilling information are being transmitted.

33. A method according to claim 32 wherein the frames transmitting directional drilling information include direction and inclination.

34. A method according to claim 15 comprising switching automatically to the first or second mode.

35. A method according to claim 34 comprising switching modes in response to the nature of the data.

36. A method according to claim 35 comprising switching modes in response to detecting a header or other encoding in a frame of data.

\* \* \* \* \*